Oct. 9, 1962 J. WEISE ETAL 3,057,280
PHOTOGRAPHIC CAMERA WITH COCKING BY ELECTRIC MOTOR
Filed Feb. 21, 1961 4 Sheets-Sheet 1

Inventors
JOHANNES WEISE
WERNER HAHN
By *Irwin S. Thompson*
Attorney

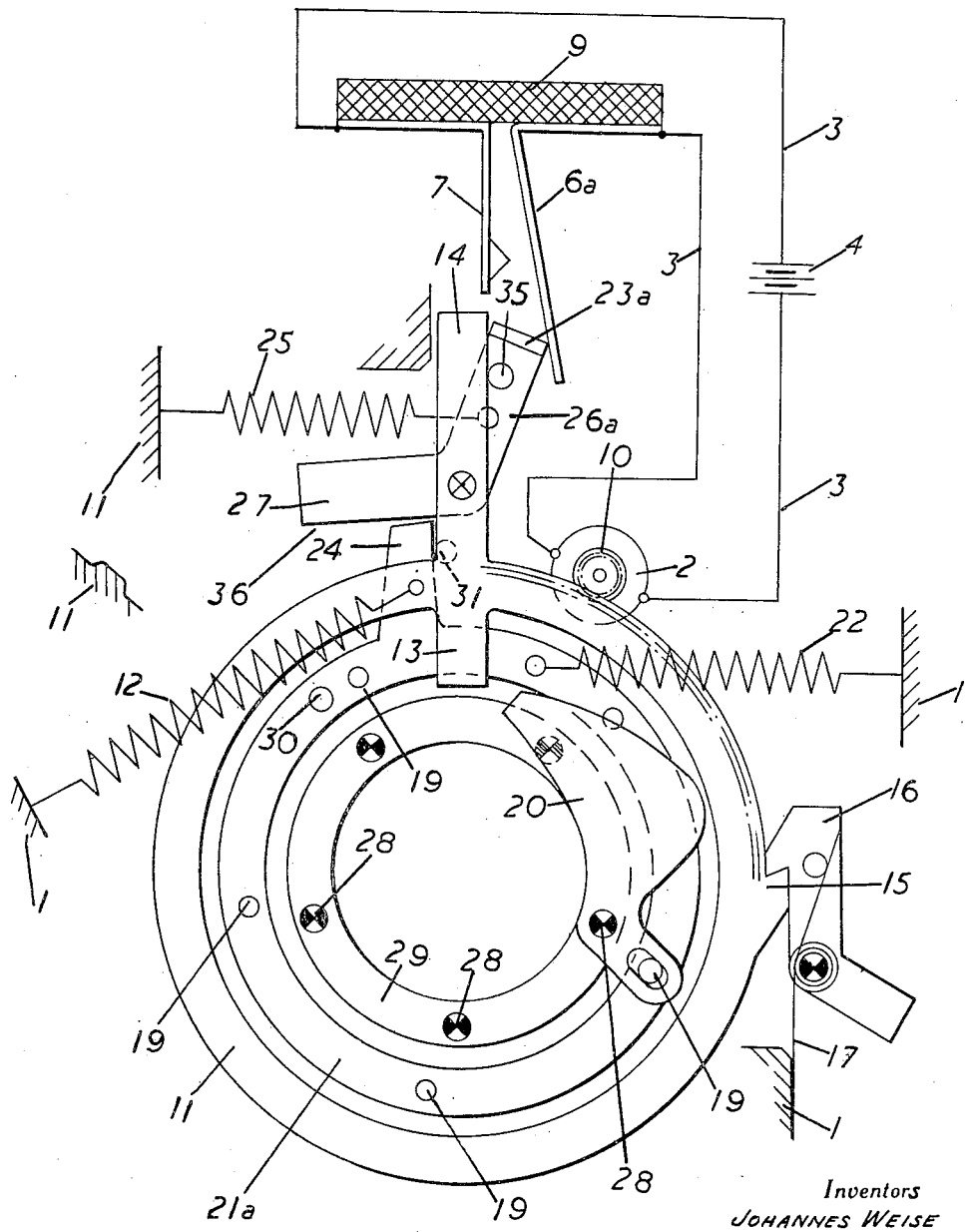

3,057,280
PHOTOGRAPHIC CAMERA WITH COCKING BY ELECTRIC MOTOR
Johannes Weise and Werner Hahn, Dresden, Germany, assignors to VEB Kamera- und Kinowerke Dresden, Dresden, Germany
Filed Feb. 21, 1961, Ser. No. 90,673
7 Claims. (Cl. 95—64)

The present invention relates to a photographic camera having a shutter cocked by an electric motor, which occurs automatically after every exposure operation.

In known photographic cameras of this nature a switch lying in the motor current circuit is moved by the shutter mechanism when it runs down, for example as the cocking ring returns into the rest position it closes the motor current circuit. The cocking of the cocking ring then takes place. This arrangement however necessitates additional constructional parts which keep the motor current circuit closed possibly through parallel-connected contacts or special locking members until the end of the cocking operation. Apart from the extra expense necessary due to the additional constructional parts, this arrangement gives rise to faults and disturbances of the camera operation.

It is the object of the invention to avoid the above disadvantages through a novel switch actuation.

According to the invention there is provided a photographic camera having a housing and a shutter mounted in said housing, the provision of an electric motor for cocking said shutter, a switch connected in the current circuit of said motor, an exposure mechanism movable in opposite directions towards the end of the exposure operation and towards the end of the cocking operation to close and open said switch respectively, whereby the cocking operation commences automatically after each exposure operation.

Constructional forms of the invention will now be described, by way of example, with reference to the accompanying drawings in which:

FIGURE 4 shows this further form of embodiment after the termination of the cocking operation.

Figure 1:
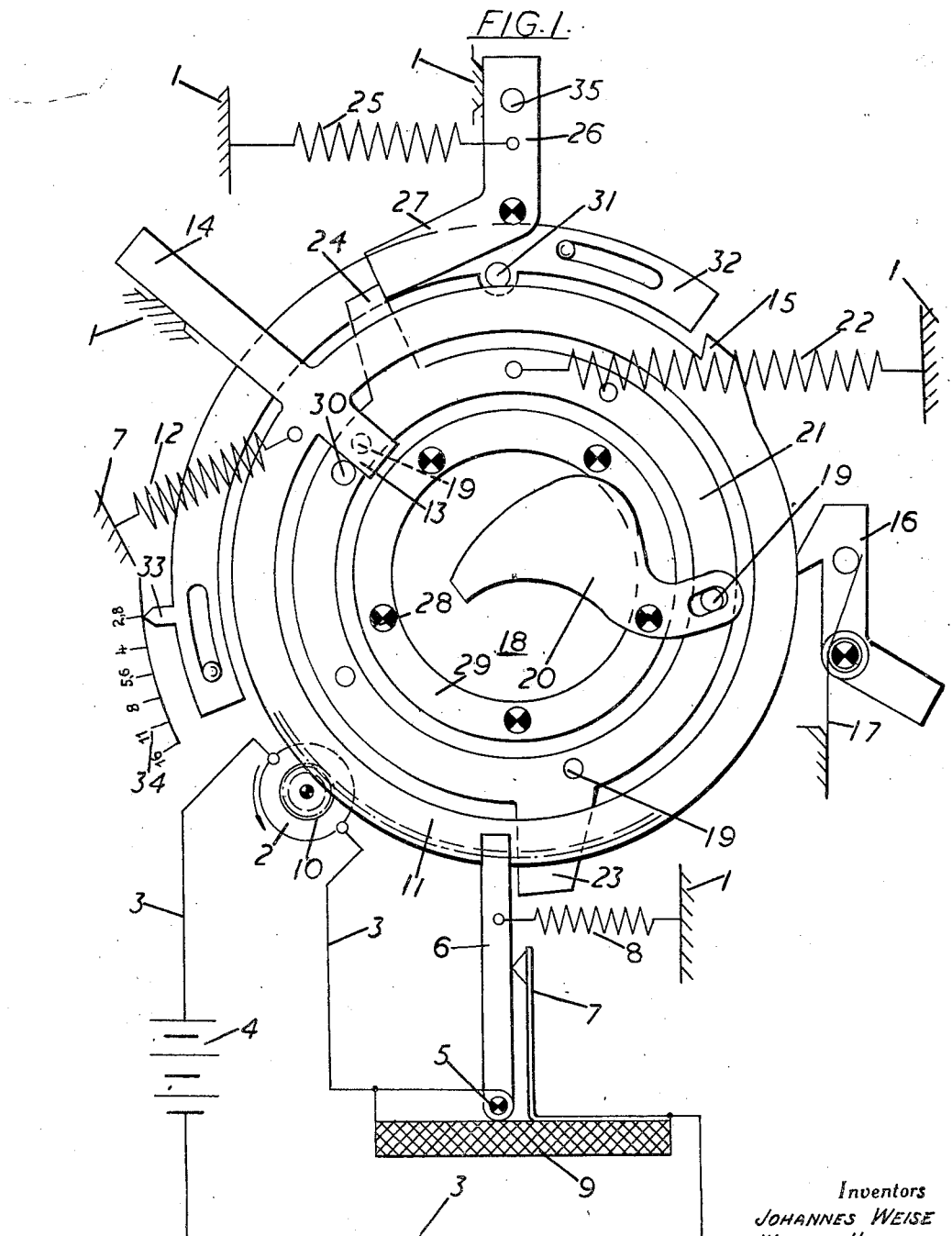
FIGURE 1 shows an embodiment of the invention after the exposure operation is terminated.
Figure 2:
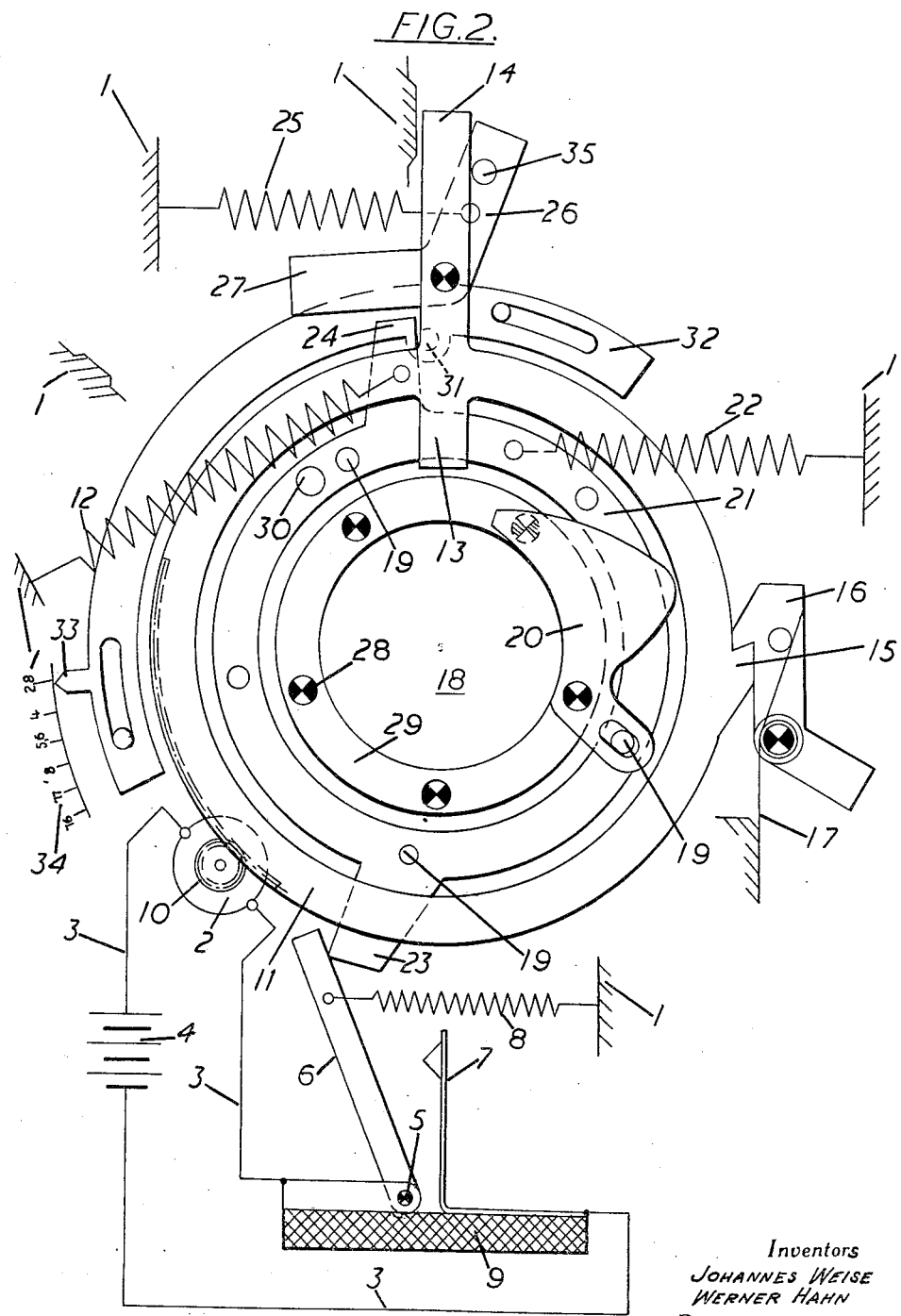
FIGURE 2 shows the same form of embodiment after the termination of the cocking operation.

Referring to FIGURES 1 and 2, in a camera housing 1, only indicated, there is arranged a battery operated electric motor 2 which is connected through a lead 3 with a battery 4. A switch consisting of a contact lever 6, rotatable about a pin 5, and a counter-contact 7 serves for the interruption of the current circuit of the motor 2. The contact lever 6 and the counter-contact 7 are arranged on an insulating plate 9. A spring 8 is attached at one end to the housing 1 and urges the contact lever 6 into contact with the counter-contact 7.

A pinion 10 of the motor 2, geared with other mechanisms, such as the film winder, which have to be operated and brought into readiness for picture-taking, meshes with gear teeth on the periphery of a shutter cocking ring 11, to which there is secured one end of a drive spring 12 which is attached by its other end to the housing 1. The shutter cocking ring 11 co-operates with a shutter mechanism of known style of construction. The shutter cocking ring 11 possesses a drive member 13, a release arm 14, and a nose 15, behind which a latch member 16 can engage under the action of a spring 17. Arranged concentrically with a light passage aperture 18 is a rotatable diaphragm blade driving ring 21 carrying drive pins 19 for diaphragm blades 20, on which ring there is secured one end of a setting spring 22, the other end of which is attached to the housing 1. Pivot pins 28 of the diaphragm blades 20 are arranged on a ring 29 which is rigidly mounted on the housing 1. The diaphragm ring 21 possesses a switch arm 23 and a projection 24, behind which a second latch member 27 of a pawl 26 can engage under the action of a locking spring 25. The diaphragm ring 21 also possesses a pin 30 which lies in the path of the drive member 13 of the shutter cocking ring 11.

In the path of the projection 24, provided on the diaphragm ring 21, there extends a setting stop 31 of a diaphragm aperture setting means 32, a pointer 33 of which is settable by reference to a diaphragm scale 34.

The manner of operation is as follows:

Towards the end of the exposure operation (see FIGURE 1) the shutter cocking ring 11, returning under the action of the drive spring 12 into the rest position, has rotated the diaphragm blade driving ring 21 against the action of the setting spring 22 by drivably engaging the drive member 13 with the pin 30. In this position the diaphragm ring 21 is held by the pawl 26 which as a result of the locking spring 25 has engaged the projection 24 with the locking arm 27. At the same time the switch arm 23 of the diaphragm ring 21 allows the spring 8 to press the contact lever 6 against the counter-contact 7 and thus to close the current circuit 3. The pinion 10 of the motor 2 is consequently rotated in the direction of the arrow and in this rotation drives the shutter cocking ring 11 and the further mechanisms, such as for example the film winder, which are not illustrated and which are to be brought into readiness for picture taking.

Towards the end of the cocking operation (see FIGURE 2) the release arm 14 strikes upon a pin 35 of the pawl 26 and rotates the latter in the clockwise direction, so that the locking arm 27 is pivoted out of the path of the projection 24. The shutter cocking ring 11 is then held in its cocked position by the engagement of the latch member 16 with the nose 15. Consequently, the diaphragm ring 21 can run off under the action of the setting spring 22, until the projection 24 strikes upon the setting stop 31 of the diaphragm aperture setting means 32, whereby the pre-selected diaphragm aperture is set. In the running off of the diaphragm ring 21 the switch arm 23 rotates the contact lever 6 against the spring 8 about the pin 5, whereby the current circuit 3 is interrupted and the motor 2 is stopped.

Figure 3:
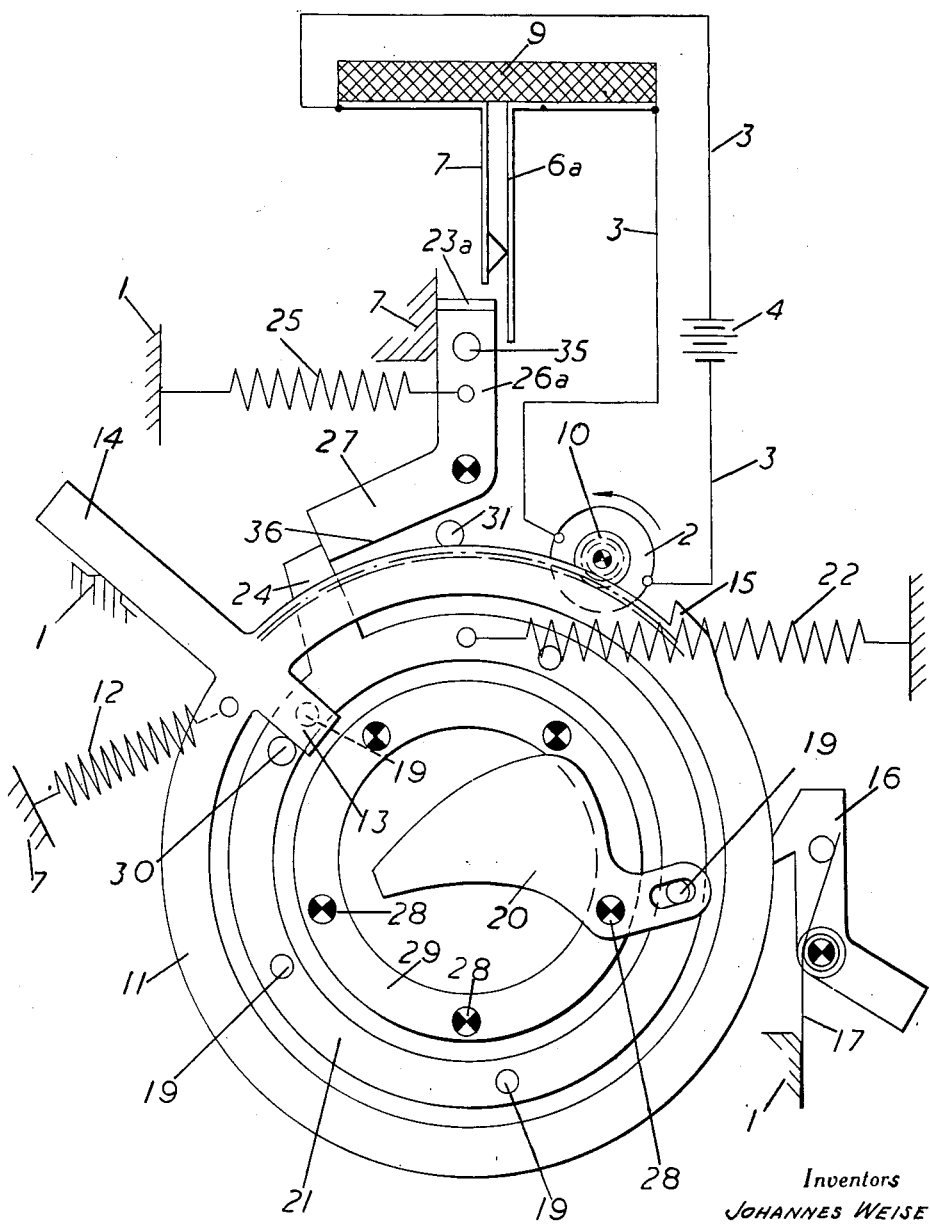
FIGURE 3 shows a further embodiment of the invention after the termination of the exposure operation.

A further embodiment of the invention is illustrated in FIGURES 3 and 4. The assembly is substantially the same as in the case of the embodiment shown in FIGURES 1 and 2, with the exception that the diaphragm ring 21 has been replaced by a diaphragm ring 21a, the pawl 26 by a pawl 26a and the switch arm 23 has been omitted and in place of it the pawl 26a has a switch arm 23a. Furthermore, the contact lever 6 has been replaced by the resilient contact tongue 6a.

The manner of operation is again substantially the same:

Towards the end of the running off movement (see FIGURE 3) of the shutter cocking ring 11, the drive member 13 drivably engages the pin 30 of the diaphragm ring 21a and rotates the latter against the action of the setting spring 22. In this movement the projection 24 slides along an edge 36 of the locking arm 27 of the pawl 26a. The length of the edge 36 corresponds to the maximum path of adjustment of the diaphragm aperture setting means 32. Only when the locking arm 27 can drop under the action of the locking spring 25 and engage the projection 24 does the switch arm 23a depart from the contact tongue 6a, which consequently contacts the counter-contact 7. The current circuit 3 is thus closed, and the motor 2 commences its cocking movement.

Towards the end of the cocking operation (see FIG-

URE 4) the release arm 14 of the shutter cocking ring 11 strikes upon the pin 35 and rotates the pawl 26a against the locking spring 25. The locking arm 27 then comes out of engagement with the projection 24, so that the setting spring 22 can rotate the diaphragm ring 21a in the clockwise direction and can set the diaphragm aperture determined by the pre-selected position of the setting stop 31. At the same time, the switch arm 23a abuts against the resilient contact tongue 6a and lifts the latter away from the counter-contact 7. Thus the current circuit 3 is opened and the motor 2 is stopped. In the cocking position the latch member 16 engages the nose 15 of the shutter cocking ring 11.

We claim:
1. In a photographic camera having a housing and a shutter mounted in said housing, the provision of a spring urged shutter cocking ring rotatably mounted in said housing and movable between a rest position and a cocked position, first latch means for retaining the shutter cocking ring in cocked position, a series of diaphragm blades pivoted on said housing, diaphragm aperture setting means mounted in said housing, a diaphragm blade driving ring rotatably mounted in said housing and pivotally connected to said diaphragm blades to move said blades between a closed position and any pre-selected open position, a projection on said diaphragm blade driving ring, a setting stop on said setting means and lying in the path of said projection, second latch means for retaining said diaphragm blade driving ring ring with the diaphragm blades closed, spring means for urging said blade driving ring toward a pre-selected open position, a battery operated electric motor for driving said shutter cocking ring against the action of its spring toward the cocked position, a switch connected in the circuit of said electric motor, means for releasing said second latch means when said motor drives said cocking ring, means for opening said switch on release of said second latch means and means for drivably engaging said diaphragm ring with said shutter cocking ring when said cocking ring runs down on release of said first latch means.

2. A photographic camera as claimed in claim 1, wherein said means for opening said switch is provided on the diaphragm blade driving ring.

3. A photographic camera as claimed in claim 2, wherein a switch arm is arranged on the diaphragm ring.

4. A photographic camera as claimed in claim 1, wherein a switch arm is arranged on said second latch means.

5. A photographic camera as claimed in claim 4, wherein the length of a locking arm of a pawl of the second latch means, which can engage with the diaphragm ring, corresponds to the maximum path of adjustment of the diaphragm aperture setting means.

6. A photographic camera as claimed in claim 1, wherein the diaphragm ring is entrained into the cocking position against its drive spring by the shutter cocking ring returning into its rest position, and the second latch means holding the diaphragm ring is actuated by the shutter cocking ring reaching its cocked position, for the purpose of release of the diaphragm ring.

7. A photographic camera as claimed in claim 1 wherein a switch arm arranged on the diaphragm ring actuates the switch and holds the current circuit of the motor opened when the diaphragm ring is in the cocked position and allows it to close when the diaphragm ring is in the rest position.

References Cited in the file of this patent
UNITED STATES PATENTS 2,399,476    Doyle _____ Apr. 30, 1946
2,795,175    Foster _____ June 11, 1957